(12) United States Patent
Gehringhoff

(10) Patent No.: US 6,398,289 B1
(45) Date of Patent: Jun. 4, 2002

(54) SIDE IMPACT BEAM

(75) Inventor: Ludger Gehringhoff, Paderborn (DE)

(73) Assignee: Benteler Automobiltechnik GmbH & Co. KG, Paderborn (DE)

( * ) Notice: Subject to any disclaimer, the term of this patent is extended or adjusted under 35 U.S.C. 154(b) by 0 days.

(21) Appl. No.: 09/770,364

(22) Filed: Jan. 25, 2001

(30) Foreign Application Priority Data

Oct. 24, 2000 (EP) .............................. 00123024

(51) Int. Cl.[7] .................................................. B60J 5/04
(52) U.S. Cl. ..................... 296/146.6; 296/188; 296/202
(58) Field of Search ........................ 296/146.6, 188, 296/189, 202

(56) References Cited

U.S. PATENT DOCUMENTS

| | | | | |
|---|---|---|---|---|
| 3,887,227 A | * | 6/1975 | Deckert ..................... | 296/188 |
| 4,328,642 A | * | 5/1982 | Presto ......................... | 49/502 |
| 4,800,638 A | * | 1/1989 | Herringshaw et al. ... | 296/146.6 |
| 5,536,060 A | * | 7/1996 | Rashid et al. ............ | 296/146.6 |
| 5,600,931 A | * | 2/1997 | Jonsson ..................... | 296/146.6 |
| 5,692,797 A | * | 12/1997 | Dancasiu .................. | 296/146.6 |
| 5,992,922 A | * | 11/1999 | Harbig et al. ............. | 296/146.6 |
| 6,176,542 B1 | * | 1/2001 | Gooding et al. .......... | 296/146.6 |
| 6,290,282 B1 | * | 9/2001 | Hortlund et al. ......... | 296/146.6 |
| 6,302,473 B1 | * | 10/2001 | Weber ....................... | 296/146.6 |

FOREIGN PATENT DOCUMENTS

| | | | | |
|---|---|---|---|---|
| DE | 296 22 985 U1 | | 11/1997 | |
| FR | 2698322 | * | 5/1994 | ................. 296/188 |
| JP | 56-50813 | * | 5/1981 | ................. 296/188 |
| JP | 62-1626 | * | 1/1987 | ................. 296/188 |
| JP | 5-38992 | * | 2/1993 | ............. 296/146.6 |

* cited by examiner

Primary Examiner—Joseph D. Pape
Assistant Examiner—Hilary Gutman
(74) Attorney, Agent, or Firm—Friedrich Kueffner

(57) ABSTRACT

A side impact beam for integration in a vehicle door of a motor vehicle has a beam member having a hat-shaped profiled section extending at least over a preponderant portion of a length of the beam member. The hat-shaped profiled section has a longitudinal stay and leg portions connected to opposed edges of the stay. The hat-shaped profiled section has an end section facing a door column when mounted in the vehicle door. A hook is connected to the end section and angled toward the door column, wherein the hook is configured to engage an opening in an inner sheet metal part of the vehicle door. The hook has a hat-shaped cross-section and is arranged at an end face of the end section, wherein the end section has a height tapering in a direction toward the hook.

5 Claims, 2 Drawing Sheets

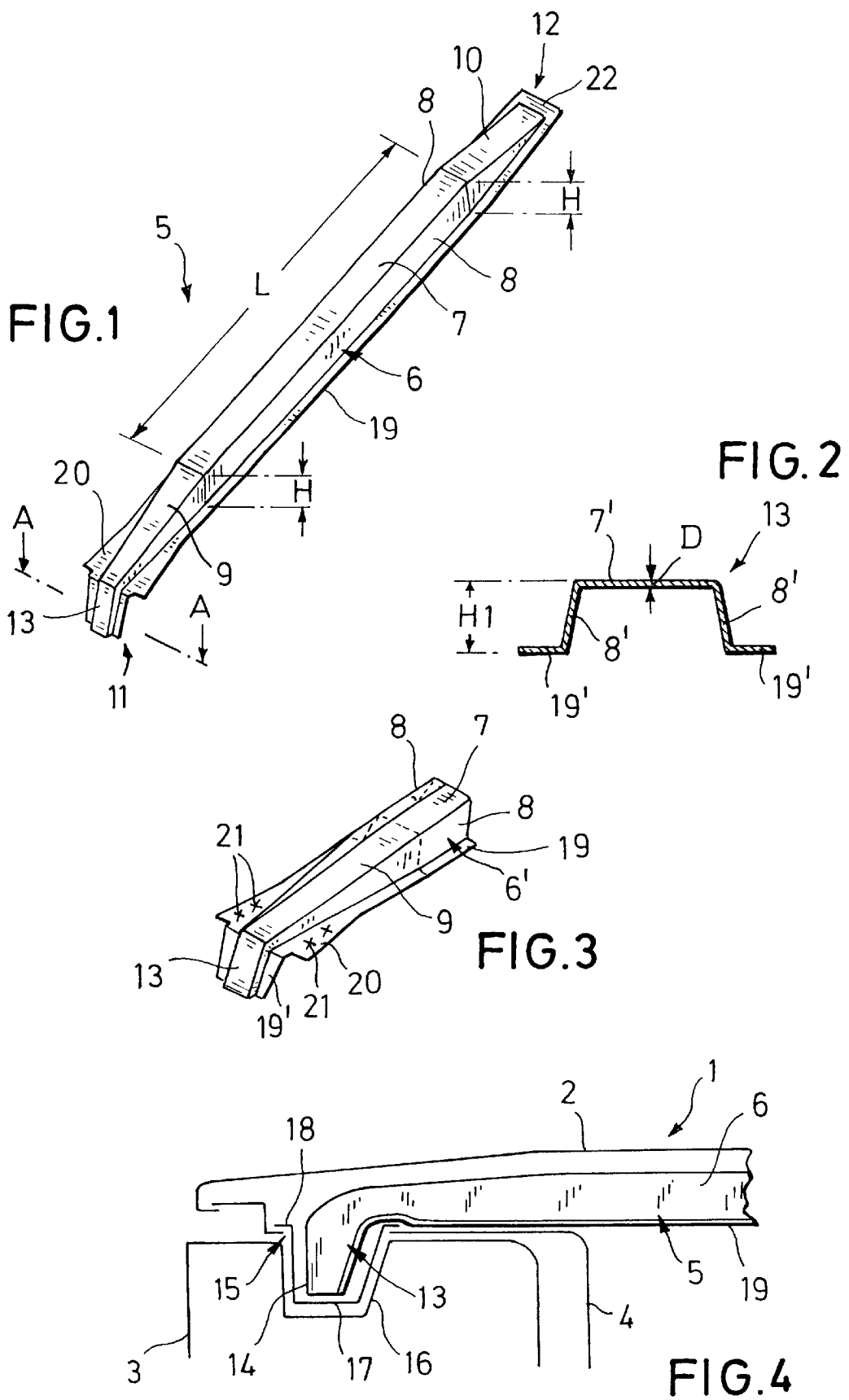

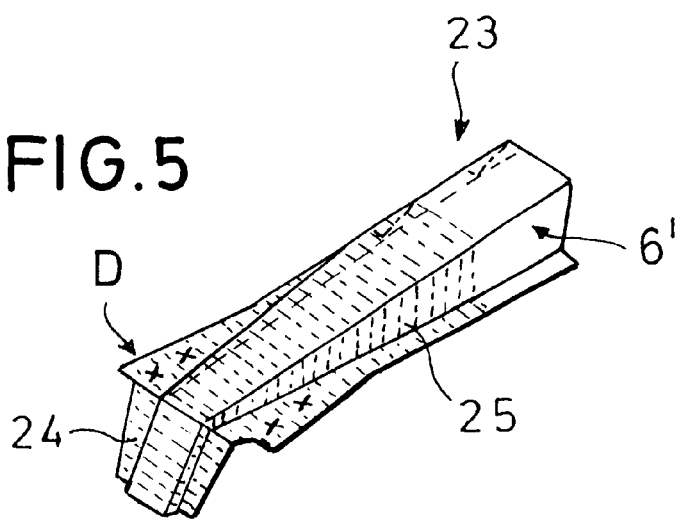
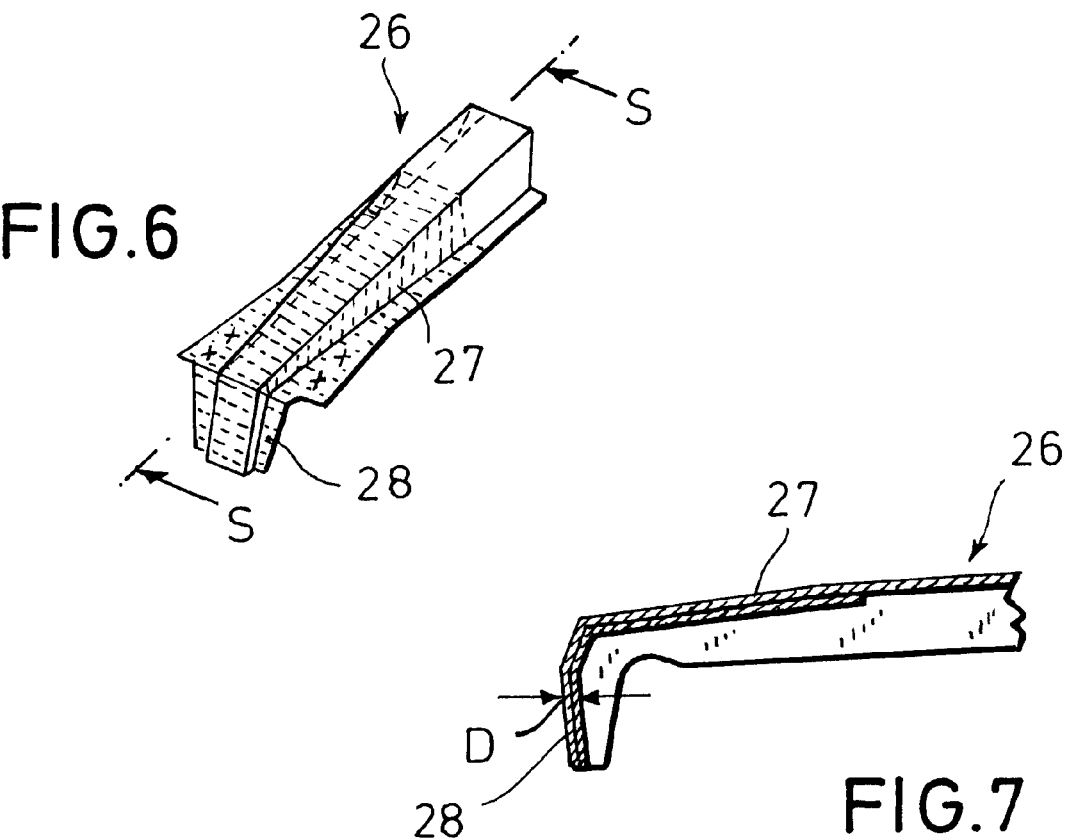

SIDE IMPACT BEAM

BACKGROUND OF THE INVENTION

1. Field of the Invention

The invention relates to a side impact beam for integration into a vehicle door of a motor vehicle, wherein the side impact beam over at least the preponderant portion of its length has a profiled section with a hat-shaped cross-section comprising a stay and two leg portions, wherein the profiled section comprises a hook on an end section of the profiled section facing the door column, wherein the hook is angled toward the door column and engages an opening in the inner sheet metal of the vehicle door.

2. Description of the Related Art

Such a side impact beam is known from German patent document 296 22 985 U1. This side impact beam is provided at one end with a connecting tab that is bent upwardly from a planar end section. This connecting tab forms a hook and projects into one of the door columns of the vehicle body when the door is closed. The hook is designed to provide, in addition to the door lock connection of the vehicle door, a second positive-locking connection and to provide an additional safety feature in the case of a side impact. A weak point of this known design is, however, the planar end section which can buckle or break off upon side impact. Also, the hook is not sufficiently bending resistant. The hook can therefore fulfill its function only to a limited extent. A desired higher lateral rigidity as well as safety is thus achieved only to a limited extent.

SUMMARY OF THE INVENTION

It is an object of the present invention to provide a side impact beam which is improved with regard to its function and which ensures a more stable connection to the door column in a load situation.

In accordance with the present invention, this is achieved in that the hook has a hat-shaped cross-section and is arranged at the end face of the end section which has a decreasing height.

Accordingly, the hook has a hat-shaped cross-section and is arranged at the end face of the end section which decreases in its height. The hat-shaped cross-section extends from the middle section of the profiled section across the end section wherein the height of the end section, starting at the middle section, decreases toward the end face. The end section then has a transition into the hook, i.e., the end section and the hook form a unitary part.

The side impact beam according to the invention is configured in an optimized fashion with regard to loading. It has a profile of continuous thickness from the center to the end without easily bendable areas.

When the door is closed, the hook provides a stable second positive-locking connection to the door column. An increased lateral rigidity and thus an increased energy absorption in the case of a side impact are thus ensured.

The side impact beam according to the invention can be used in front doors as well as rear doors. The hook engages accordingly either a cutout in the B column or in the C column of the vehicle body.

According to a further embodiment of the invention, the hook has a thickness that is increased relative to the remaining portion of the side impact beam. Accordingly, the general strength and flexural strength can be further increased in the connecting area. Preferably, the thickness of the sheet metal in the end section relative to the sheet metal of the remaining profiled section is greater by a factor 1.5.

The reinforcement of the hook area can be realized by using a blank sheet metal which at one end has a sheet metal portion which is thicker in comparison to the remaining sheet metal area. Such sheet metals are also referred to in the art as tailored blanks.

Possible is also the use of so-called patchwork blanks in which at the hook-side end at least one further sheet metal is connected in a sandwich construction. The hook is then of a double layer construction. The double layer construction is realized preferably by folding the sheet metal in the area of the end section. This is advantageous with regard to manufacturing technological considerations.

According to a further preferred embodiment, transversely projecting flanges are provided on the leg portions of the profiled section. This feature also enhances the flexural strength of the side impact beam and the denting resistance of the door in an advantageous manner. The flanges extend along the end sections up to the hook. They widen along the end sections at least over portions thereof. This configuration makes possible a stable securing of the side impact beam on the inner sheet metal of the door, preferably by spot welding. Moreover, by widening the flanges the strength of the end section at the hook is increased. In a preferred embodiment, the hook also has lateral flanges.

For reasons of corrosion protection and of safety, the hook is provided with a plastic cap. This measure also improves the visual appearance.

The side impact beam according to the invention is formed of super high strength sheet metal that is cold and hot formable. Moreover, it is provided with a surface protection, for example, by hot galvanizing or electro-galvanizing.

BRIEF DESCRIPTION OF THE DRAWING

In the drawing:

FIG. 1 shows the side impact beam according to the invention in a perspective illustration;

FIG. 2 shows a section view along the line A—A of the hook of the side impact beam according to the invention;

FIG. 3 shows a detail view of the end section provided with the hook;

FIG. 4 shows schematically in a horizontal longitudinal section the mounted position of the side impact beam according to the invention in a vehicle door;

FIG. 5 shows the end section of a side impact beam according to the invention manufactured of a tailored blank;

FIG. 6 shows the end section of a side impact beam produced by folding;

FIG. 7 is a section view along the line S—S of the illustration according to FIG. 6.

DESCRIPTION OF THE PREFERRED EMBODIMENTS

FIG. 4 shows a detail of a motor vehicle door 1 for a motor vehicle. The outer skin 2 of the vehicle door 1 is curved slightly outwardly in the longitudinal direction of the vehicle. The door column 3 (B column) belonging to the vehicle frame and the inner sheet metal 4 of the door are also illustrated in a technically simplified illustration.

Between the outer skin 2 and the inner sheet metal 4 of the door, a side impact beam 5 is integrated in the vehicle door 1 (see also FIGS. 1 through 3). The side impact beam 5 has a beam member comprised of sheet metal and is designed to stiffen the vehicle door 1 against side impact and to absorb energy.

FIG. 1 shows clearly that the side impact beam 5 has along its longitudinal middle section L a hat-shaped profiled section 6 comprised of the stay 7 and two lateral leg portions 8 connected to opposite longitudinal edges of the stay 7. End sections 9, 10 adjoin the profiled middle section 6 as unitary parts. The end sections also have a hat-shaped cross-section, and the height H of the end sections 9, 10 decreases from the longitudinal middle section L to the end faces 11, 12 of the side impact beam 5.

At the end face 11 of the end section 9 facing the door column a hook 13 angled toward the door column 3 is provided. The free end 14 of the hook 13 is guided through an opening 15 in the inner sheet metal 4 of the vehicle door 1. As illustrated in FIG. 4, the hook 13 engages an engagement pocket 16 of the door column 3 when the door is closed. The reference numeral 17 indicates a plastic cap which covers the free end 14 of the hook 13 projecting past the inner sheet metal 4 of the door. The plastic cap 17 is supported at the inner side of the vehicle door 1 with radial legs 18 on the inner sheet metal 4 of the door.

The section view illustration of FIG. 2 shows that the hook 13 has also a hat-shaped cross-section with stay 7' and two leg portions 8'. Preferably, the profile height H1 of the hook 13 is at least 15 mm. This ensures a high flexural strength.

Flanges 19 are connected to the longitudinal edges of the leg portions 8 of the profiled section 6. They extend transversely to the leg portions 8 and, along the end section 9, the flanges 19 extend up to the hook 13. At the end face 11 the flanges 19 have wide flange end portions 20.

By means of these wide flange end portions 20, the side impact beams 5 are secured on the door structure. The connecting locations for spot welding are indicated in FIG. 3 with reference numeral 21. On the leg portions 8' of the hook 13, transversely extending flanges 19' are provided. Also, the oppositely positioned end section 10 of the side impact beam 5 comprises flanges 19 which project transversely from the leg portions 8. A flange 22 is also provided at the end face 12.

The embodiment illustrated in FIG. 5 shows a side impact beam 23 with a reinforcement portion (indicated by hatching) in the area of the hook 24. The reinforcement portion is produced by using a tailored blank.

In this embodiment, the thickness of the sheet metal in the end section 25, including the hook 24, is reinforced with regard to its thickness in comparison to the remaining profiled section 6' by using a correspondingly tailored sheet metal. The end portion 25 has a thickness D which is 1.5 times greater than the thickness of the sheet metal in the profiled middle section.

In the embodiment of the side impact beam 26 according to FIGS. 6 and 7, the end section 27, including the hook 28, is of a double-layer construction (indicated by hatching). For this purpose, the sheet metal blank in the area of the end section 27 is folded, as clearly shown, in particular, in the sectional view S—S according to FIG. 7. Thus, the hook 28 is reinforced with regard to its thickness D in comparison to the remaining profiled section.

Otherwise, the side impact beams 23 or 26 correspond to the configuration explained above.

While specific embodiments of the invention have been shown and described in detail to illustrate the inventive principles, it will be understood that the invention may be embodied otherwise without departing from such principles.

What is claimed is:

1. A side impact beam for integration in a vehicle door of a motor vehicle, the side impact beam comprised of:

a beam member having a hat-shaped profiled section extending at least over a preponderant portion of a length of the beam member;

the hat-shaped profiled section comprised of a longitudinal stay and leg portions connected to opposed edges of the stay;

the hat-shaped profiled section having an end section facing a door column when mounted in the vehicle door;

a hook connected to the end section and angled toward the door column, wherein the hook is configured to engage an opening in an inner sheet metal part of the vehicle door;

wherein the hook has a hat-shaped cross-section and is arranged at an end face of the end section, wherein the end section has a height tapering in a direction toward the hook.

2. The side impact beam according to claim 1, wherein the hook is thicker than the hat-shaped profiled section.

3. The side impact beam according to claim 2, wherein the hook is double-layered.

4. The side impact beam according to claim 1, wherein the hat-shaped profiled section comprises flanges connected to longitudinal edges of the leg portions remote from the stay and projecting transversely from the leg portions and away from one another, wherein the flanges extend along the end section up to the hook and have widened areas.

5. The side impact beam according to claim 1, wherein the hook has a plastic cap.

* * * * *